Oct. 2, 1956
R. A. MACKIE
2,765,184
PEDAL SEAL
Filed Dec. 18, 1953
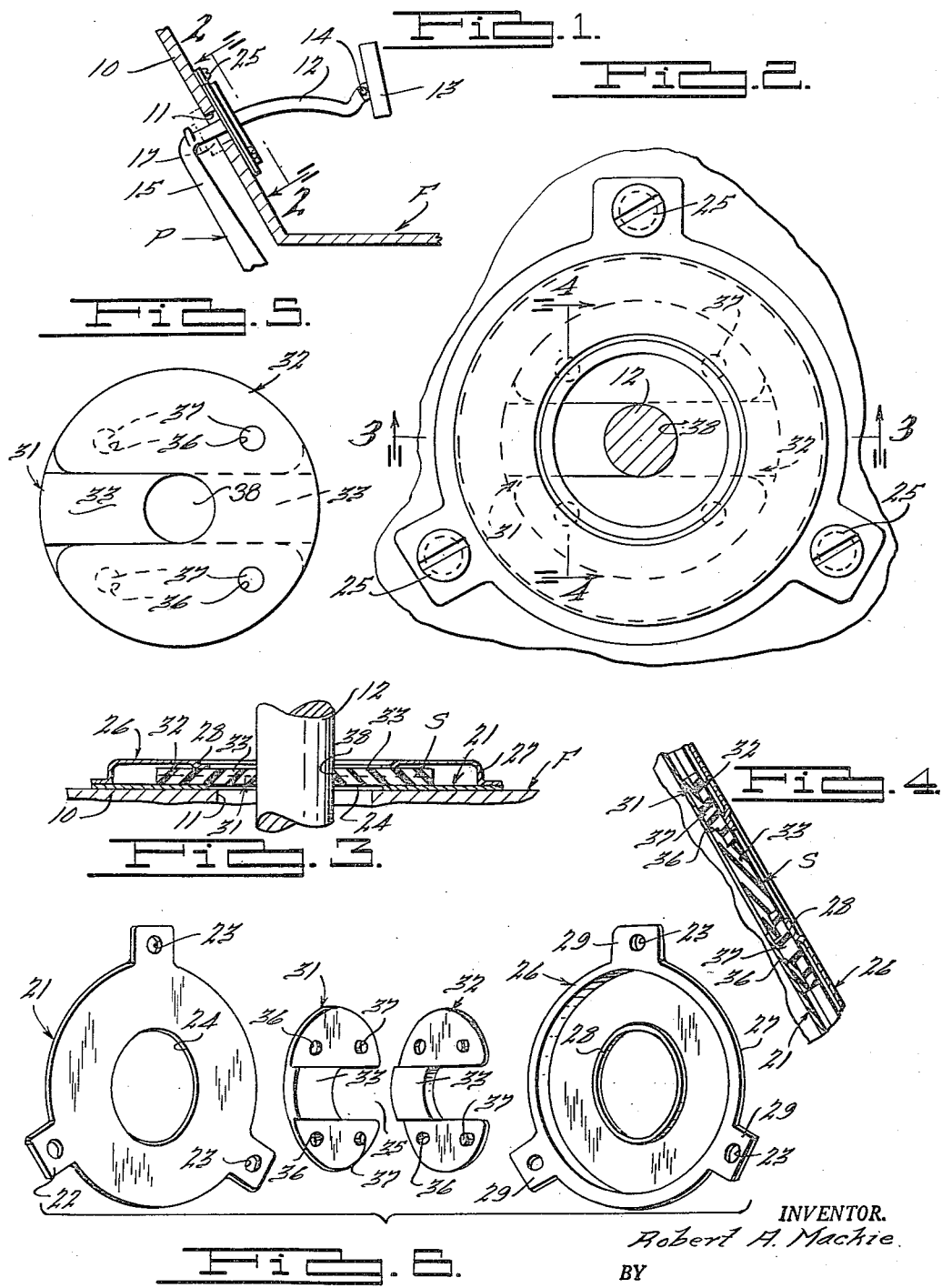
INVENTOR.
Robert A. Mackie.
BY
Harness and Harris
ATTORNEYS.

United States Patent Office 2,765,184
Patented Oct. 2, 1956

2,765,184

PEDAL SEAL

Robert A. Mackie, Berkley, Mich., assignor to Chrysler Corporation, Highland Park, Mich., a corporation of Delaware Application December 18, 1953, Serial No. 398,931

2 Claims. (Cl. 286—15)

This invention relates to a seal for a movable shaft or rod and particularly to a device of this type adapted to seal a motor vehicle control pedal supporting arm against the associated vehicle body floor or wall that is pierced by the movable pedal supporting arm.

It is a primary object of this invention to provide a sealing device of this type that is simple in design, low in cost, easy to install, efficient in its ability to seal, and free of friction as well as noise.

It is still another object of this invention to provide a laminated type of rod or shaft seal comprising a housing and a floating type of sealing ring that is movably mounted in the seal housing so as to effectively seal the rod or shaft against the housing that is pierced by the said rod or shaft.

Other objects and advantages of this invention will become readily apparent from a reading of the following description and a consideration of the related drawings wherein:

Fig. 1 is a fragmentary sectional elevational view of a portion of the control compartment of a motor vehicle or the like;

Fig. 2 is an enlarged sectional elevational view of portions of the structure shown in Fig. 1, the view being taken along the line 2—2 of Fig. 1;

Fig. 3 is a sectional elevational view taken along the line 3—3 of Fig. 2;

Fig. 4 is a sectional elevational view taken along the line 4—4 of Fig. 2;

Fig. 5 is a top plan view of the assembled sealing rings used in this sealing device; and Fig. 6 is an exploded view of the several components of this sealing device.

In the drawings the reference numeral 10 represents the forward portion of the floor F of a motor vehicle control compartment. Floor portion 10 is pierced by an opening 11 that is adapted to receive the arm 12 of the pedal P. Pedal arm 12 has a foot pad 13 detachably mounted on its free end by means of the bolt type connector 14. Pedal arm 12 is integral with the crank arm 15 that is adapted to be hingedly mounted on the vehicle by means not shown. It is thought to be obvious that as the pedal P is depressed and returned to its extended position shown in Fig. 1 that the pedal arm 12 will be moved to various positions in the floor opening 11 and consequently the floor opening 11 must be considerably larger than the diameter of the pedal pad supporting arm 12. It is the primary object of this invention to provide a simple, low cost, readily installed type of sealing device to effectively seal the opening 11 in the floor portion 10 while providing for ready movement of the pedal arm 12 in the floor opening 11.

In the past a rubber or plastic ring or collar, similar to that shown at 17 in Fig. 1, has been used to seal pedal arms in installations of this type. These collar type seals have not been completely satisfactory because they usually seal only when the pedal is in released or fully extended position and thus they do not provide a continuous seal. Furthermore, these seals become worn very easily, they do not stay in proper sealing position, they are located on the under or engine side of the floor 10 and thus they are attacked by heat and oil from the engine and in addition they may be a source of objectionable noise if they thump against the underside of the floor 10 due to improper positioning on the pedal arm 12.

The sealing device herein disclosed comprises a two-piece, ring-shaped housing and a two-piece, ring-shaped seal that is adapted to float within the housing. The housing includes a flat, apertured plate 21 that resembles a ring-like washer element and it may be formed with a plurality of radially extending, pierced tabs or fingers 22. The openings 23 in the tabs 22 are adapted to receive screws 25 or the like that anchor the housing plate 21 in position around the opening 11 in floor 10. The central opening 24 in the housing plate 21 is of considerably greater diameter than the diameter of the pedal arm 12. In fact the central opening 24 in housing plate 21 may be approximately the size of the opening 11 in the floor 10.

The other plate 26 of the housing is dished to provide a cup-type container to receive the associated sealing ring S. Plate 26 is essentially a ring-like washer that has an L-shaped flange 27 extending about its outer periphery. The inner periphery of the ring-like plate 26 may be offset as at 28 so as to provide the minimum contact area between the seal S and the housing plate 26. Plate 26 includes apertured, radially extending, tabs or fingers 29 that may be aligned with the apertured tabs 22 of plate 21. The screws 25 may be passed through the apertures 23 in the aligned plates 21, 26 to anchor the housing in position. The diameter of the central opening 30 in the plate 26 is considerably larger than the diameter of the pedal arm 12 and it may be the size of the opening 24 in plate 21.

The seal S is composed of a pair of identical, complementary, U-shaped, substantially flat plates of suitable sealing material that can be a plastic such as nylon or the like. The seal plates 31 and 32 being identical, only one will be described in detail. From a consideration of Figs. 4, 5, and 6 particularly, it will be noted that the plate 31 is essentially flat and of uniform thickness except at the location of the upstanding portion 33 that is equal to twice the thickness of the other portions of the plate 31. The upstanding portion 33 is located diametrically opposite the opening or mouth 35 of the U-shaped plate 31. The plate 31 adjacent each side of the upstanding portion 33 is pierced by an aperture 36 and adjacent each side of the mouth 35 is formed with an upstanding stud 37.

When the two complementary plates 31, 32 are superimposed then a double thickness ring is formed having a central opening 38 (see Figs. 2, 3, and 5) that is of such size as to sealingly receive the pedal arm 12. The diameter of the opening 38 is substantially equal to the diameter of the arm 12. By using a pair of U-shaped plates each with a mouth 35 of a width equal to the diameter of the arm 12 it is thought to be obvious that the two plates 31, 32 may be slid on the arm 12 from opposite sides and then the plates 31, 32 pressed together to snap the aligned studs 36 and apertures 37 into locking engagement so as to provide a sealing ring that fits snugly about the arm 12.

Installation of a sealing device of this type in the disclosed vehicle control compartment may be as follows. First the lower housing plate 21 is slipped over the free end of the pedal arm 12 which does not have the pedal pad 13 attached to the arm 12 at this time; then the plate 12 is slipped along the arm 12 until it engages the floor 10; next the two U-shaped plates 31, 32 are placed around the arm 12 and pressed together so as to fix the plates around the arm 12 as a ring-like collar; thereafter the dished upper housing plate 26 is threaded over the free end of arm 12 and slipped along the arm 12 until it engages the lower housing plate 21. The tabs 22, 29 on the plates 21, 26 are then aligned and the mounting screws 25 inserted through the tab openings 23 and anchored in the floor 10. Finally the pedal pad 13 is connected to the free end of the pedal arm 12 and the assembly is completed.

Thus it will be seen that the sealing device can be quickly and easily assembled from within the vehicle control compartment. Furthermore a seal is provided that will continuously seal regardless of the position of the pedal. In addition all seal parts are protected from engine heat and oil and there is no reason for objectionable seal noise or the like during pedal movement.

I claim:

1. A sealing device comprising a shallow housing having an aperture therethrough to receive a member to be sealed and a plastic seal element floatingly mounted in said housing, said seal having central portions thereof adapted to sealingly engage the periphery of the member to be sealed and the peripheral edges thereof spaced from the interior of said housing, said housing comprising a pair of superimposed plates having aligned apertures to loosely receive the member to be sealed and said seal element comprising a pair of complementary slotted plates each of which has a slot formation opening through an edge thereof, said slotted plates being formed such that upon aligned superimposition thereof portions of said complementary plates encircle and sealingly engage the complete periphery of the member to be sealed, and said complementary plates also including integral, interengageable, locking means located within the housing to retain said plates in superimposed assembled relationship.

2. A sealing device comprising a shallow housing having an aperture therethrough to receive a member to be sealed and a ring-shaped, plate-like seal element floatingly mounted in said housing having the inner peripheral portions thereof adapted to sealingly engage the periphery of the member to be sealed and other surface portions thereof to sealingly engage the interior of the housing with the peripheral edges of the seal element spaced from the interior walls of the housing, said housing comprising a pair of complementary plates formed to provide a shallow shell with each plate having an aperture to loosely receive the member to be sealed, and said seal element comprising a pair of substantially U-shaped plates formed such that upon aligned superimposition thereof in opposed relationship portions of the slots in said complementary plates encircle and sealingly engage the complete periphery of the member to be sealed, said complementary U-shaped seal plates also including integral, interengageable, stud and socket locking means positioned within the housing to retain said plates in superimposed assembled relationship.

References Cited in the file of this patent

UNITED STATES PATENTS

| | | |
|---|---|---|
| 1,029,143 | Rich | June 11, 1912 |
| 1,220,155 | Fraser | Mar. 20, 1917 |
| 1,436,530 | Ray | Nov. 21, 1922 |
| 1,588,447 | Colbert | June 15, 1926 |
| 1,597,983 | Kongsrud | Aug. 31, 1926 |
| 2,186,277 | Tetens | Jan. 9, 1940 |
| 2,404,539 | Schmidt | July 23, 1946 |

FOREIGN PATENTS

| | | |
|---|---|---|
| 140,308 | Great Britain | Mar. 25, 1920 |